May 7, 1935. A. WOLLENSAK 2,000,811
ADJUSTABLE LENS MOUNT
Filed Dec. 11, 1933
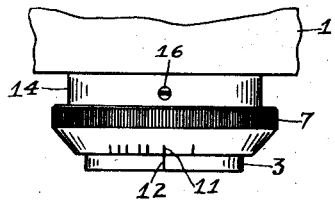
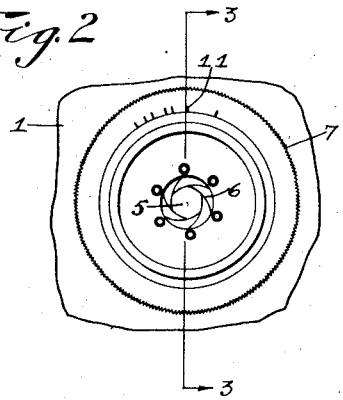
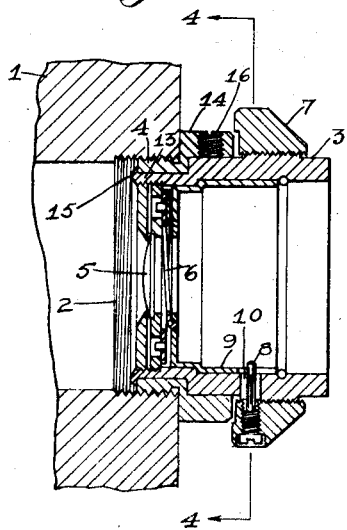
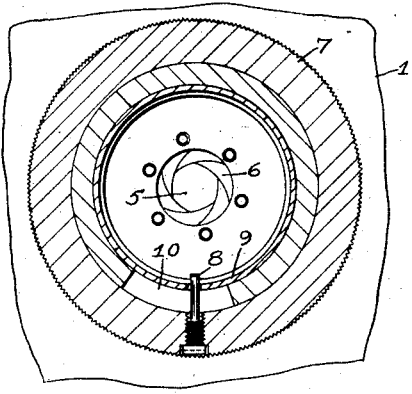
INVENTOR
Andrew Wollensak
BY Harold E. Stonebraker
ATTORNEY Patented May 7, 1935

2,000,811

UNITED STATES PATENT OFFICE 2,000,811

ADJUSTABLE LENS MOUNT

Andrew Wollensak, Rochester, N. Y., assignor to Wollensak Optical Company, Rochester, N. Y., a corporation of New York Application December 11, 1933, Serial No. 701,831

5 Claims. (Cl. 95—64)

My invention relates to an attaching mechanism for a lens mount such as used in motion picture cameras, and for other purposes, and has for its object to afford a simple and practical construction that enables quickly securing such parts in the supporting wall of a camera or otherwise while permitting an adjustment that enables readily positioning the iris diaphragm and its controlling parts so as to be conveniently operated and manipulated.

When a lens mount is secured in a camera, it is desirable that the parts be so positioned that the reading scale on the adjusting ring of the iris diaphragm, and the marker with which it is associated, be located at the top so as to be easily observed by the operator, and it is difficult to locate these parts properly owing to slight variations in the cooperating threads by which the assembly is secured to its support.

When the lens mount is threaded as far as it will go into the support, sometimes the indicating scale or reading matter will be at a position difficult to observe, and the purpose of my invention is to provide a structure whereby, after the assembly is threaded into the support as far as it will go, the diaphragm adjusting ring and the marker can be turned until the desired indications are at the top, and the parts then locked to maintain this relationship permanently.

In general, this is accomplished by means of an attaching ring constituting a part of the lens mount or diaphragm assembly, having possible rotative movement and held against longitudinal movement with relation to the barrel within which the diaphragm is mounted, or other carrier, the attaching ring being threaded into the support and provision being made for adjusting the barrel or carrier rotatively of the attaching ring and then locking it in the desired position.

To these and other ends, the invention consists in the construction and arrangement of parts that will appear clearly from the following description when read in conjunction with the accompanying drawing, the novel features being pointed out in the claims following the specification.

In the drawing:

Fig. 1 is a plan view illustrative of one possible embodiment of the invention;

Fig. 2 is a front elevation;

Fig. 3 is a sectional view on line 3—3 of Fig. 2, and

Fig. 4 is a sectional view on line 4—4 of Fig. 3.

Referring more particularly to the drawing in which like reference numerals refer to the same parts throughout the several views, 1 designates any suitable support, as for instance a wall of a motion picture camera, provided with a threaded opening 2 that receives the parts in question, such for instance as the lens mount and diaphragm assembly now to be described.

The latter comprises a barrel including a body portion 3 and a reduced inner end 4 within which is mounted the lens 5 and iris diaphragm 6, the latter being controlled by the adjusting ring 7 which is threaded on the barrel and operatively connected with the iris diaphragm through the pin 8 and inner ring 9, rotative adjustment of the ring 7 being limited by the slot 10 within which the pin 8 is movable. The parts just described, including the lens, iris diaphragm and adjusting ring 7, are old, and of themselves form no part of my invention, the novelty of which resides in the manner in which these parts are attached to their support.

The adjusting ring 7 carries an indicating scale shown at 11 which cooperates with a marker 12 on the barrel, the ring 7 being adjustable to vary the size of the opening in the iris diaphragm. The operator determines this by the position of the scale 11 with reference to the fixed marker 12, and it is essential that the indicating scale 11 and marker 12 be located at the top when the parts are finally assembled, as otherwise the operator could not readily observe the scale to make the necessary adjustments of the diaphragm.

In order to accomplish this, I provide a structure whereby the diaphragm assembly, including the barrel 3 and the adjusting ring 7, can be turned bodily after it is tightly secured to the support, until the indicating scale 11 and marker 12 are at the top. This is effected by mounting an attaching ring 13 upon the reduced inner end 4 of the barrel. The attaching ring at its forward end engages the adjacent surface of the body portion of the barrel and is provided with an offset extension 14 surrounding and embracing the body portion, while the reduced portion 4 has an outwardly turned flange 15 that engages the inner end of the attaching ring 13 and thus holds it permanently on the barrel against endwise movement.

It will be understood that in assembling these parts, the attaching ring 13 is first positioned over the reduced portion 4 of the barrel and the flange 15 is thereafter bent over the inner end of the attaching ring to prevent its removal. The attaching ring 13 is threaded exteriorly for engagement with the threaded opening 2 in the support, and 16 is a set screw threaded into an opening in the offset extension 14 of the attaching ring and engageable with the body portion 3 of the barrel, constituting a locking means for holding the barrel or lens mount in the desired adjusted relation within the attaching ring.

In the attachment of the assembly to a support, the unit is threaded into the opening 2 until the attaching ring 13 is tight therein as far as it will enter. Then the screw 16 is loosened to permit turning the barrel 3 and parts carried thereby until the scale 11 and marker 12 are at the top, as shown in Fig. 1. Thereupon the screw 16 is tightened and the barrel 3 thereby held against further rotative movement, and the scale of the adjusting ring for the iris diaphragm is then in proper position to be observed and manipulated by the operator at all times.

While the invention has been described with reference to one particular embodiment, it is not confined to the details herein described, and this application is intended to cover such modifications or departures as may come within the purposes of the invention or the scope of the following claims.

I claim:

1. The combination with a support having a threaded opening, of a barrel, an attaching ring rotatably mounted on the barrel and having a threaded portion engageable with said threaded opening in the support, means for preventing movement of the ring endwise of the barrel, and means for adjustably locking the barrel against rotative movement relatively to said ring.

2. The combination with a support having a threaded opening, of a barrel having a body portion and a reduced portion positionable within said threaded opening, an attaching ring rotatably mounted on said reduced portion and having an offset extension surrounding and embracing the body portion of the barrel, an outwardly projecting flange at the inner end of the barrel engaging the inner end of said ring to prevent endwise movement thereof, the ring being threaded exteriorly for engagement with said threaded opening in the support, and means carried by the ring for adjustably engaging the barrel to lock the latter against rotative movement within the ring.

3. The combination with a support having a threaded opening, of a barrel provided with an iris diaphragm, an adjusting ring having limited movement rotatively of the barrel for controlling said iris diaphragm, an attaching ring rotatively mounted on the barrel and held against endwise movement thereon, said attaching ring being threaded for engagement with the threaded opening in the support, and means for adjustably locking the barrel against rotative movement relatively to the attaching ring.

4. The combination with a support having a threaded opening therein, of a barrel provided with an iris diaphragm, an adjusting ring having rotative movement on the barrel for controlling the iris diaphragm, an attaching ring rotatively mounted on the barrel, the latter having an outwardly directed flange at its inner end engaging the inner end of the attaching ring to hold the latter against endwise movement, the attaching ring being threaded for engagement with the threaded opening in the support, and means carried by the attaching ring for adjustably engaging and locking the barrel against rotative movement within said ring.

5. The combination with a support having a threaded opening, of a barrel provided with an iris diaphragm, an adjusting ring having limited rotative movement on the barrel for controlling the diaphragm, the barrel having a body portion and a reduced portion at its inner end positionable within the support, an attaching ring rotatable on said reduced portion and having an offset extension overlying and embracing the body portion of the barrel, an outwardly extending flange at the inner end of the barrel engaging the inner end of the attaching ring to prevent endwise movement thereof on the barrel, the attaching ring being exteriorly threaded for engagement with said threaded opening in the support and the support being engageable by said offset extension when the attaching ring is tightened, and means carried by the attaching ring and adjustably engageable with the barrel for locking the latter against rotative movement within the attaching ring.

ANDREW WOLLENSAK.